US006701868B1

(12) United States Patent
Shepherd (10) Patent No.: US 6,701,868 B1
(45) Date of Patent: Mar. 9, 2004

(54) AUTOMATED, SELF-CLEANING CAT LITTER BOX APPARATUS (76) Inventor: John V. Shepherd, P.O. Box 2149, Running Springs, CA (US) 92382

( * ) Notice: Subject to any disclaimer, the term of this patent is extended or adjusted under 35 U.S.C. 154(b) by 0 days.

(21) Appl. No.: 10/283,486

(22) Filed: Oct. 30, 2002

(51) Int. Cl.[7] .............................................. A01K 29/00
(52) U.S. Cl. ....................... 119/166; 119/161; 119/168; 119/165
(58) Field of Search ................................. 119/166, 163, 119/161, 162, 168, 165, 164, 167

(56) References Cited

U.S. PATENT DOCUMENTS

| | | | |
|---|---|---|---|
| 3,482,546 A | * | 12/1969 | Anderson |
| 4,190,525 A | * | 2/1980 | Menzel ........................ 209/235 |
| 4,802,442 A | * | 2/1989 | Wilson ........................ 119/166 |
| 5,048,465 A | | 9/1991 | Carlisi |
| 5,113,801 A | * | 5/1992 | Rotstein et al. ............. 119/163 |
| 5,272,999 A | * | 12/1993 | Nussle ........................ 119/166 |
| 5,460,122 A | | 10/1995 | Reinartz |
| 5,662,066 A | * | 9/1997 | Reitz ........................... 119/163 |
| 5,749,318 A | | 5/1998 | Barbot |
| 5,823,137 A | * | 10/1998 | Rood et al. .................. 119/166 |
| 5,893,336 A | * | 4/1999 | Vice et al. ................... 119/166 |
| 5,911,194 A | * | 6/1999 | Pierson, Jr. .................. 119/166 |
| 5,931,119 A | | 8/1999 | Nissim |
| RE36,847 E | | 9/2000 | Waters |
| 6,202,595 B1 | * | 3/2001 | Atcravi ........................ 119/165 |
| 6,378,461 B1 | | 4/2002 | Thaler |
| 6,401,660 B1 | * | 6/2002 | Wolff .......................... 119/165 |
| 6,401,661 B1 | | 6/2002 | Emery |

FOREIGN PATENT DOCUMENTS

DE 4127835 A1 * 8/1991 .......... A01K/23/00

* cited by examiner

Primary Examiner—Peter M. Poon
Assistant Examiner—Andrea M. Valenti
(74) Attorney, Agent, or Firm—Howard R. Lambert (57) ABSTRACT

A self-cleaning cat litter box apparatus comprises a litter tray for containing a quantity of cat litter, a waste bin, and a mesh basket sized for having lower regions received into the litter. A supporting frame and the basket form a basket assembly that is hinged relative to the litter tray for pivotal movement between a lowered position in which the lower regions of the basket are immersed in cat litter contained in the litter tray and an upright position in which cat waste-containing clumped litter picked up from the tray by the basket is gravity dumped into the waste bin. A basket motor is connected for causing the pivoting of the basket assembly between the lowered and upright positions and for simultaneously opening and closing a waste bin door. Operation of the basket motor is responsive to a cat entering and subsequently leaving the litter tray. Another motor is connected for oscillating the basket assembly relative to the litter tray when pivoting of the basket assembly from its lowered position is started and again as the basket assembly is pivoted back close to its lowered position to facilitate the lifting of the basket from and immersing the basket into, cat litter in the litter tray.

14 Claims, 9 Drawing Sheets

AUTOMATED, SELF-CLEANING CAT LITTER BOX APPARATUS

BACKGROUND OF THE INVENTION

1. Field of the Invention

The present invention relates generally to the field of pet supplies, more particularly to cat (kitty) litter boxes, and still more particularly to self-cleaning cat (kitty) litter boxes.

2. Background Discussion

According to a 1999 poll (reportedly having a +/-3% probability of error) conducted by the American Pet Association, 31.2 million United States' households, out of a total of 102.8 million households, had at least one cat as a pet, with cats outnumbering dogs by 74,894,580 to 61,542,900.

As is well known to cat owners, most cats can be trained or taught to use specific places in the home for their toilet activities. These specific places are commonly provided with boxes (or trays) holding cat or kitty litter that is readily available in pet stores and most supermarkets.

So far as is known to the present inventor, so called self-clumping cat litter was first marketed in about the early 1990's. When a cat urinates or defecates into such type of cat litter, the moisture causes the contacted litter to aggregates into clumps that quickly harden. These hardened clumps containing the cat's urine or excrement can then be removed from the litter box by the cat owner, leaving substantially clean litter in the box for the cat's subsequent use.

The most common and inexpensive implement for removing these hardened clumps of cat litter are hand-held, slotted metal or plastic scoops. Although effective in removing the clumps of cat litter from a litter box, the use of such manual scoops requires constant personal attention to the litter boxes to keep them clean. Otherwise many or most cats will either refuse to use the litter boxes or else will paw the hardened clumps from the litter boxes onto the floor, in the process usually scattering loose cat litter all over the floor, thereby creating a messy clean-up problem. Moreover using a hand-held scoop to clean out cat litter boxes is understandably a disagreeable task for many if not most cat owners, since the individual doing the scooping must have his or her face close to the litter box and is thereby exposed to unpleasant smells.

The above-described forming of hardened clumps of cat litter containing a cat's urine or excrement lends itself to automated cleaning of litter boxes. This type of litter box is commonly referred to as a self-cleaning or self-collecting litter box. Exemplary of such self-cleaning litter boxes are those disclosed in the below-cited United States Patents.

U.S. Pat. No. Re. 36,847, issued Sep. 5, 2000 to Michael A, Waters, for example, discloses a self-cleaning cat litter box that utilizes a multi-toothed element or comb that is automatically moved linearly through a fixed litter tray to rake clumped litter from the litter tray into a waste receptacle. U.S. Pat. No. 6,378,461, issued Apr. 30, 2002 to Arnold Thaler also discloses an automated self-cleaning cat litter box that utilizes a comb automatically moved linearly through a fixed litter box to rake clumped litter from the litter tray into a waste receptacle. U.S. Pat. No. 5,048,465, issued Sep. 17, 1991 to Angelo Carlisi, discloses still another automated self-cleaning cat litter box that utilizes a comb that is moved through a fixed litter box to rake clumped litter from the litter and deposit the clumped litter into a waste receptacle.

U.S. Pat. No. 5,931,119, issued Aug. 3, 1999 to Ofer Nissim et al., discloses an automated self-cleaning cat litter box that utilizes a horizontally revolving litter tray having a retractable comb that accumulates clumped litter as the litter tray revolves under the comb. The comb is periodically pivoted upwardly to discharge the clumped litter into a waste receptacle. U.S. Pat. No. 6,401,661, issued Jun. 11, 2002 to Richard H. Emery, also discloses an automated self-cleaning cat litter box that utilizes a horizontally revolving litter tray having a fixed comb that collects clumped litter from the litter as the litter tray revolves under the comb. A screw mechanism then removes the clumped litter from the comb to a waste receptacle.

U.S. Pat. No. 5,749,318, issued May 12, 1998 to Gerard Barbot, et al., discloses a self-cleaning litter box that utilizes a screen-type conveyor belt in communication with litter in a litter tray to separate clumped litter from clean litter, the clumped litter being discharged into a waste receptacle and the clean litter being returned to the litter tray. U.S. Pat. No. 5,460,122, issued Oct. 24, 1995 to Johann C. Reimartz, discloses an automated self-cleaning cat litter box incorporating a movable litter tray floor that removes used litter from the litter tray and discharges it into a receptacle as the floor is moved in one direction, and causes fresh litter to be discharged from a litter reservoir into the litter tray as the floor is moved in the opposite direction.

Although the disclosed automatic self-cleaning cat litter boxes may be reasonably useful, most, principally the comb-type self-cleaning litter boxes, that have been commercially available, for example, in pet stores, have a disadvantage that the combs, especially the movable combs, tend to become with clogged with or by clumped litter to an extent that their operation is adversely affected.

For this and other reasons, a principle objective of the present invention is to provide an automatic self-cleaning cat litter box apparatus that is both effective and reliable in operation.

SUMMARY OF THE INVENTION

In accordance with the present invention, there is provided a self-cleaning cat litter box apparatus that comprises a litter tray for containing a quantity of cat litter, a waste bin and a mesh basket sized for having a lower basket regions received into the litter tray. The basket is pivotally mounted relative to the litter tray for pivotal movement between a lowered position in which a lower region of the basket is immersed in cat litter contained in the litter tray and a raised, tilted position in which cat waste-containing clumped litter picked up in the basket from the litter in the litter tray is gravity dumped into the waste bin.

Included is a reversing electric basket pivoting motor connected for causing the pivoting of the basket between the lowered and raised, tilted positions. A basket frame is included to which the basket is attached, A driven gear is fixed to the basket frame, and a drive gear is connected to the electric basket pivoting motor and is in driving relationship with the driven gear.

The apparatus further comprises control means configured for causing the electric basket pivoting motor to rotate in one direction to pivot the basket from the lowered position to the raised, tilted position and for then causing the electric basket pivoting motor to rotate in an opposite direction to pivot the basket from the raised, tilted position back to the lowered position. Starting of the control means is responsive to a cat entering and subsequently leaving the litter tray, the starting being delayed for a predetermined time interval of at least about one minute after a cat enters and subsequently leaves the litter tray, and is cancelled in response to a cat entering the litter tray within the predetermined time interval.

Preferably there is included an electric basket oscillating motor connected for causing the basket to oscillate back and forth relative to the litter tray and the control means are configured for causing the basket oscillating motor to oscillate the basket back and forth relative to the litter tray when the electric basket pivoting motor starts pivoting the basket from the lowered position toward the raised, tilted position and again when the electric basket pivoting motor subsequently pivots the basket back to engagement with the litter contained in the litter tray, so as to facilitating both the raising the lower regions of the basket through litter contained in the litter tray and the subsequent immersion of the lower regions of the basket into litter contained in the litter tray.

A waste bin door is hinged for pivotal movement between a closed position covering the waste bin and an open position uncovering the waste bin, the door being connected for pivoting from the closed position to the open position as the basket is pivoted from the lowered position to the raised, tilted position and for pivoting from the open to the closed position as the basket is pivoted from the raised, tilted position back to the lowered position.

More specifically, a self-cleaning cat litter box apparatus comprises a litter tray for containing a quantity of cat litter, a waste bin having an open top, a rigid basket frame and a mesh basket having a lower region sized for being received into the litter tray. The basket is attached to the basket frame to form a basket assembly that is hinged relative to the litter tray for pivotal movement between a lowered position in which the lower region of the basket is immersed in cat litter contained in the litter tray and a raised, tilted position in which cat waste-containing clumped litter picked up by the basket from litter in the litter tray is gravity dumped from the basket into the waste bin.

A reversing electric basket assembly pivoting motor is connected for causing the pivoting of the basket assembly between the lowered and raised, tilted positions, and an electric basket assembly oscillating motor is connected for causing the basket assembly to oscillate back and forth relative to the litter tray.

Included are control means configured for causing the electric basket assembly pivoting motor to rotate in one direction to pivot the basket assembly from the lowered position to the raised, tilted position and for then causing the electric basket assembly pivoting motor to rotate in an opposite direction to pivot the basket assembly from the raised, tilted position back to the lowered position, a starting of the control means being responsive to a cat entering and subsequently leaving the litter tray after a time delay period of at least about one minute after a cat, the starting of the control means being cancelled in response to a cat entering the litter tray within the delay period. The control means are also configured for causing the basket assembly oscillating motor to oscillate the basket assembly back and forth relative to the litter tray when the electric basket assembly pivoting motor starts pivoting the basket assembly from the lowered position toward the raised, tilted position and when the electric basket pivoting motor subsequently pivots the basket back close to the lowered position, thereby facilitating both the lifting of the basket lower region up through litter contained in the litter tray and the subsequent immersion of the basket lower region into litter contained in the litter tray.

The apparatus further includes a waste bin door hinged for pivotal movement between a closed position covering the waste pin and an open position uncovering the waste bin, the door being connected for pivoting from the closed position to the open position as the basket assembly is pivoted from the lowered position to the raised, tilted position and for subsequently pivoting the door from the open to the closed position as the basket assembly is pivoted from the raised, tilted position to the lowered position.

Still more particularly, a self-cleaning cat litter box apparatus comprises a base portion; a litter tray configured for containing a quantity of cat litter, the tray having a bottom and being removably installed in the base portion; a litter waste collecting and disposing portion having a top and sides; and a basket assembly, including a basket frame and a wire mesh basket attached to the basket frame. The basket has a top, a bottom, sides and first and second ends. The basket frame is hinged, along a basket frame hinge line, adjacent the basket first end to the top of the litter waste collecting and disposing portion. Lower regions of the basket sides and second end are preferably bowed outwardly and the basket first end is preferably angled toward the basket second end.

A waste bin is removably received in the base portion portion, said waste bin having an open top and including a waste bin door hinged along a waste bin door hinge line to the top of said litter waste collecting and disposing portion, the waste bin door hinge line being parallel to the basket frame hinge line and being located so said door is close to said basket first end. A basket assembly pivoting motor is connected for pivoting the basket assembly through a basket assembly pivoting angle between a first, litter engaging position and a second, elevated, cat waste-containing clumped litter dumping position. The basket assembly pivoting motor is also connected for causing at least substantially simultaneous pivoting of the waste bin door through a door pivoting angle between a first, closed position covering the waste bin open top and a second, open position uncovering the waste bin open top thereby enabling waste dumping access to the waste bin.

Means are included for mounting the litter waste collecting and disposing portion onto the base portion so that when the basket assembly is in the first, litter engaging position, the bottom of the basket is adjacent the bottom of the litter tray and is beneath cat litter contained in the tray.

Control means are further included that are responsive to a cat entering and subsequently exiting the litter tray for enabling the basket assembly pivoting motor to pivot the basket assembly from the first, litter engaging position to the second, cat waste-containing clumped litter dumping position and to pivot the waste bin door from the first, closed position to the second, open position, thereby causing cat waste-containing clumped litter picked up by the basket from litter contained in the litter tray to be gravity dumped from the basket into the open waste bin, and thereafter for causing the basket assembly pivoting motor to pivot the basket assembly back to its first, litter tray engaging position and to pivot the waste bin door back to its first, closed position.

An oscillation-causing electric motor is connected for causing oscillatory movement between the litter waste collecting and disposing portion and the base portion in a longitudinal direction that is orthogonal to the basket frame hinge line as the basket assembly is being pivoted from its first litter engaging position and as the basket assembly is being pivoted back to its first litter engaging position, thereby assisting lifting of the basket through cat litter contained in the litter tray and thereby subsequently assisting the bottom of the basket to immerse into cat litter contained in the litter tray. The oscillation-causing motor preferably causes oscillatory motion of the litter waste collecting and disposing portion through a distance of at least about one inch while the base portion remains stationary.

It is also preferred that the starting of the control means is delayed for a period of at least about one minute after a cat enters and subsequently leaves the litter tray to provide for litter clumping, and wherein the starting of the control means is cancelled in response to a cat entering the litter tray during said delay period.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the accompanying drawings in which.

In the various figures identical elements and features are given the same reference numbers.

DESCRIPTION OF A PREFERRED EMBODIMENT

Figure 1:
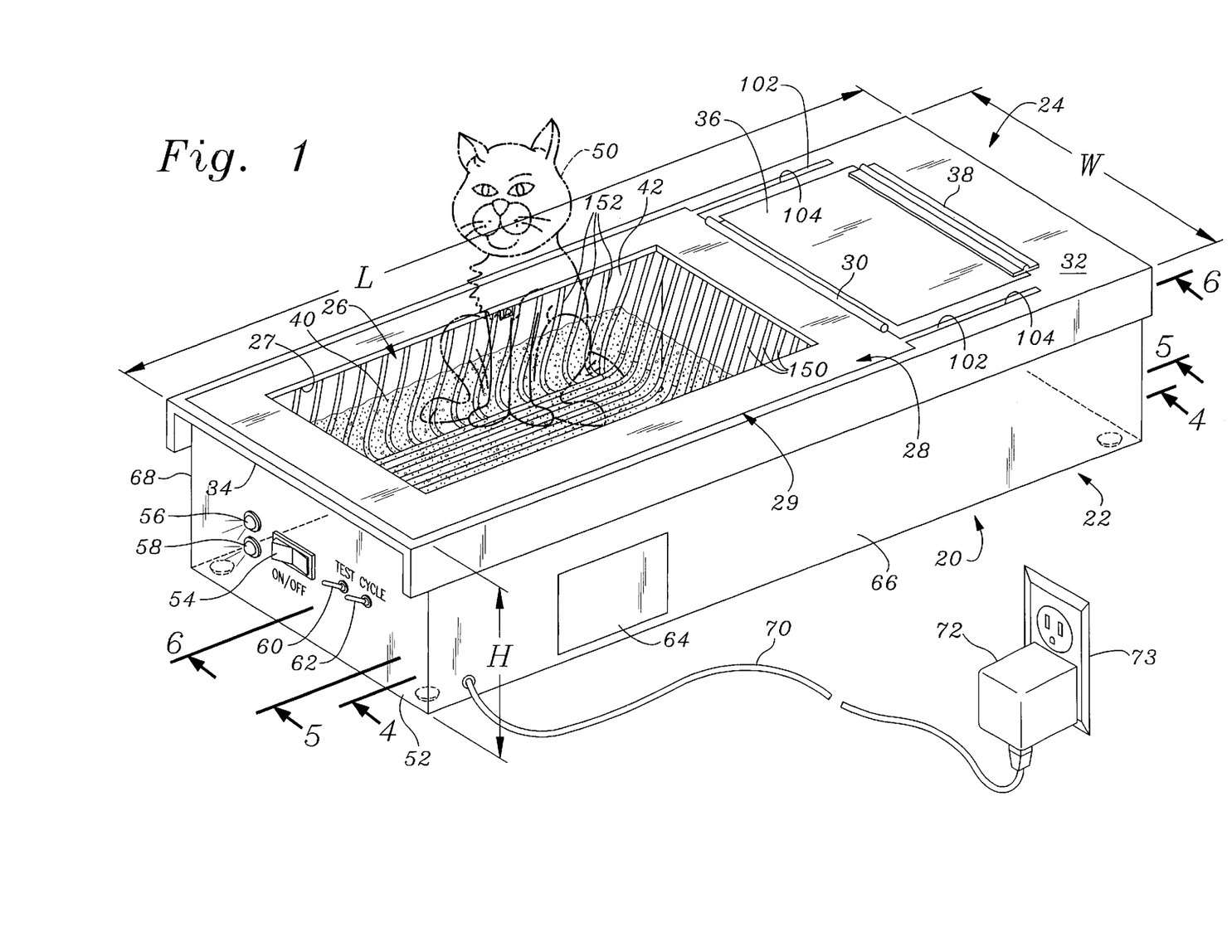
FIG. 1 is an perspective drawing of the self-cleaning cat litter box apparatus of the present invention, showing external features of the apparatus, including a base or bottom portion and a top or waste collection and disposal portion, and depicting (in phantom lines) a cat sitting on cat litter contained in a cat litter tray installed in the base portion.

There is depicted in the perspective drawing of FIG. 1, an automated, self-cleaning cat litter box apparatus 20 in accordance with a preferred embodiment of the invention. As more particularly described below, apparatus 20 comprises a base portion 22 and a top (upper) or cat waste (i.e., clumped cat litter) collection and disposal portion 24.

Included as part of top portion 24 are a wire mesh, waste-collecting or waste-collection basket 26 attached to an under side 27 of a rigid, flush-mounted, rectangular frame 28. Together, basket 26 and basket frame 28 form a basket assembly 29. Frame 28 is, in turn, pivotally mounted by a hinge 30 to an upper surface 32 of a top portion wall 34. Also included as part of top portion 24 is a flush-mounted, rectangular waste bin door 36 that is pivotally mounted by a hinge 38 to top portion upper surface 32. Waste bin door 36 is configured and located so as to cover and close a waste bin (not shown in FIG. 1) installed in base portion 22 beneath the door. Basket hinge 30 and bin door hinge 38 are mutually parallel and are positioned transversely across top portion upper surface 32.

Waste-collecting basket 26 is shown in FIG. 1 partially buried in cat litter 40 contained in a cat litter tray 42 that is received into base portion 22. A representative cat 50 is depicted in phantom lines sitting in basket 26 on top of litter 40.

Also shown in FIG. 1, located on an end 52 of base portion 22 are a system ON/OFF switch 54, respective system STANDBY (green) and OPERATIVE (red) status lights 56 and 58, and test and cycle switches 60 and 62, respectively. A small removable access door 64 is located on one outside wall 66 of base portion 22; a similar access door (not shown) is located on an opposite outside wall 68 of the base portion. Shown connected to base portion 22 is an electric power cord 70 terminating in an AC-DC transformer 72 configured for plugging into a conventional wall outlet 73.

With no limitation being thereby intended or implied, apparatus 20 may have an overall length, L, of about 28 inches, an overall width, W, of about 15 inches and an overall height, H, of about 7½ inches.

The present inventor considers that a better understanding of the invention, as is more particularly described below in conjunction with FIGS. 2–9, can, at this point, be had by considering a brief overview of how his invention, i.e., apparatus 20, functions.

BRIEF OVERVIEW OF INVENTION

As more particularly described below, when a cat (represented by cat 50) exits basket 26 after urinating or defecating onto cat litter 40, operation of apparatus 20 automatically starts after a predetermined delay sufficient to permit the cat litter to form a solid clump around the cat's urine or excrement. Basket assembly 29 is then automatically pivoted upwardly through cat litter 40, thereby picking up the clumped cat litter in basket 26, toward the basket assembly's upright position. Waste bin door 32 is simultaneously pivoted upwardly toward its open position.

As such upward pivoting of basket assembly 29 starts, top portion 24 is automatically oscillated back and forth in a longitudinal direction relative to base portion 22. This causes longitudinal oscillation of basket 26 relative to cat litter 40 in litter tray 42 to thereby facilitate raising the basket thorough the cat litter and also shaking any loose cat litter off the basket and off the picked-up litter clumps back into the litter tray.

As pivoting of basket assembly 29 continues to its vertical or over-vertical position, and with bin door 32 pivoted to its open position, the picked-up clumps of cat litter, that have been formed around cat urine or excrement, fall from basket 26 under gravity, into the uncovered waste bin located in base portion 22.

Reverse pivoting of basket assembly 29 back toward its initial position with lower regions of basket 26 immersed in litter 40 contained in litter tray 42, and of bin door 32 back toward its closed position is then automatically initiated. As basket 26 nears or reaches contact with cat litter 40 in litter tray 42, oscillation of top portion 24 relative to base portion 22 is automatically restarted to facilitate the immersion of lower regions of the basket into the cat litter while pivoting of basket assembly 29 to its initial position continues.

Figure 2:
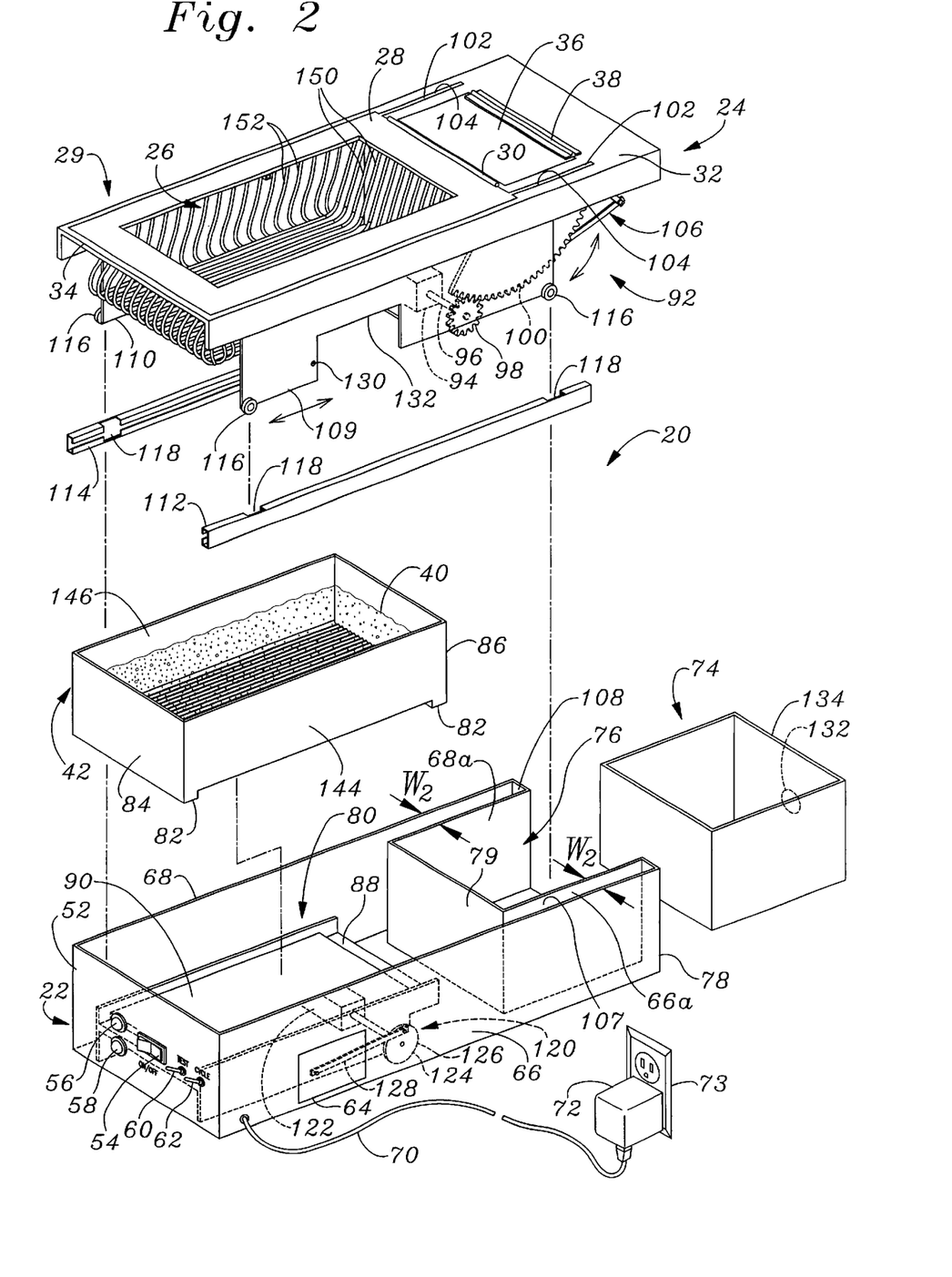
FIG. 2 is an exploded perspective drawing of the self-cleaning cat litter box apparatus of FIG. 1, showing the litter tray and a waste collecting bin included as part of the base portion and showing a waste collecting basket held in a basket frame and basket and waste bin cover operating means included in the top portion, and showing mounting rails for assembling the top portion to the base portion, and further showing (in broken lines) as part of the base portion means for causing oscillating movement of the top portion relative to the base portion after the top portion is installed on the base portion.

Referring now to FIG. 2, a generally square waste collection bin 74 is constructed for installation into, and removal from, a mating recess 76 formed into base portion 22 at a base portion end 78 (opposite to end 52) and between opposing inner side wall sections 66a and 68a and an inner transverse wall 79.

Cat litter tray 42 is constructed for installation into, and removal from, a mating recess 80 in base portion 22 between side walls 66 and 68. Transverse depending feet 82 at opposite ends 84 and 86 of litter tray 42 fit into mating transverse recesses 88 (only one of which is shown) formed at ends of a horizontal tray support member 90 installed across base portion 22 in tray receiving recess 80 to constrain the litter tray against longitudinal movement thereof relative to the base portion.

Shown as part of top portion 24 are basket assembly pivoting means 92 which comprise a miniature electric motor 94 (shown in broken lines), for example, a reversing stepper motor, having a shaft 96 on opposite ends of which are attached identical pinion gears 98 (only one of which is shown). Pinion gears 98 are drivingly engaged with corresponding ones of identical, transversely spaced apart, arcuate rack gears 100 (only one of which is shown). Rack gears 100 are fixed to basket frame extensions 102 that extend into openings 104 at top portion upper wall 34. Two linkages 106 (only one of which is shown) are pivotally connected between corresponding ones of rack gears 100 and bin door 34 to cause operation of the bin door in unison with operation of basket frame 28 (with attached basket 26).

Upon assembly of top portion 24 to base portion 22, rack gears 100 and corresponding linkages 106 are received into a narrow recess 107 defined between outside wall 66 and inner wall section 66a and into a corresponding narrow recess 108 defined between opposite outside wall 68 and inner wall section 68a. Each of recesses 107 and 108 has a width, $W_2$, that is preferably between about 0.625 inch and 0.750 inch.

Opposite side walls 109 and 110 depending from top portion 24 fit closely inside corresponding outside walls 66 and 68 of base portion 22 upon assembly of the top portion to base portion. For assembly of top portion 24 to base portion 22, an opposing pair of longitudinal side rails 112 and 114 are fastened to the inside of corresponding base portion outside walls 66 and 68. Small rollers or wheels 116 installed at all four lower corners of top portion side walls 109 and 110 are received into side rails 112 and 114 through rail cutouts 118 upon assembly of top portion 24 to base portion 22. Rollers 116 facilitate longitudinal oscillating movement of top portion 24 relative to base portion 22.

Installed in base portion 22 are top portion oscillating means 120 (shown in broken lines) that include a miniature electric motor 122 having a transverse shaft 124 to opposite ends of which are fixed identical drive wheels 126 (only one of which is shown). Two transversely spaced apart, identical links 128 (only one of which is shown) are individually pivotally attached at one end to a corresponding one of wheels 126. When top portion 24 is assembled to base portion 22, the other end of each link 128 is individually pivotally connected to a corresponding one of top portion side walls 109 and 110 at a point 130 (shown only for side wall 109) by access through side doors 64. Further, upon assembly of top portion 24 to base portion 22, a upward cutout region 132 of top portion side wall 109 and a corresponding upward cutout region (not shown) of top portion opposite side wall 110 provide clearance for shaft 124, wheels 120 and links 128.

Figure 3:
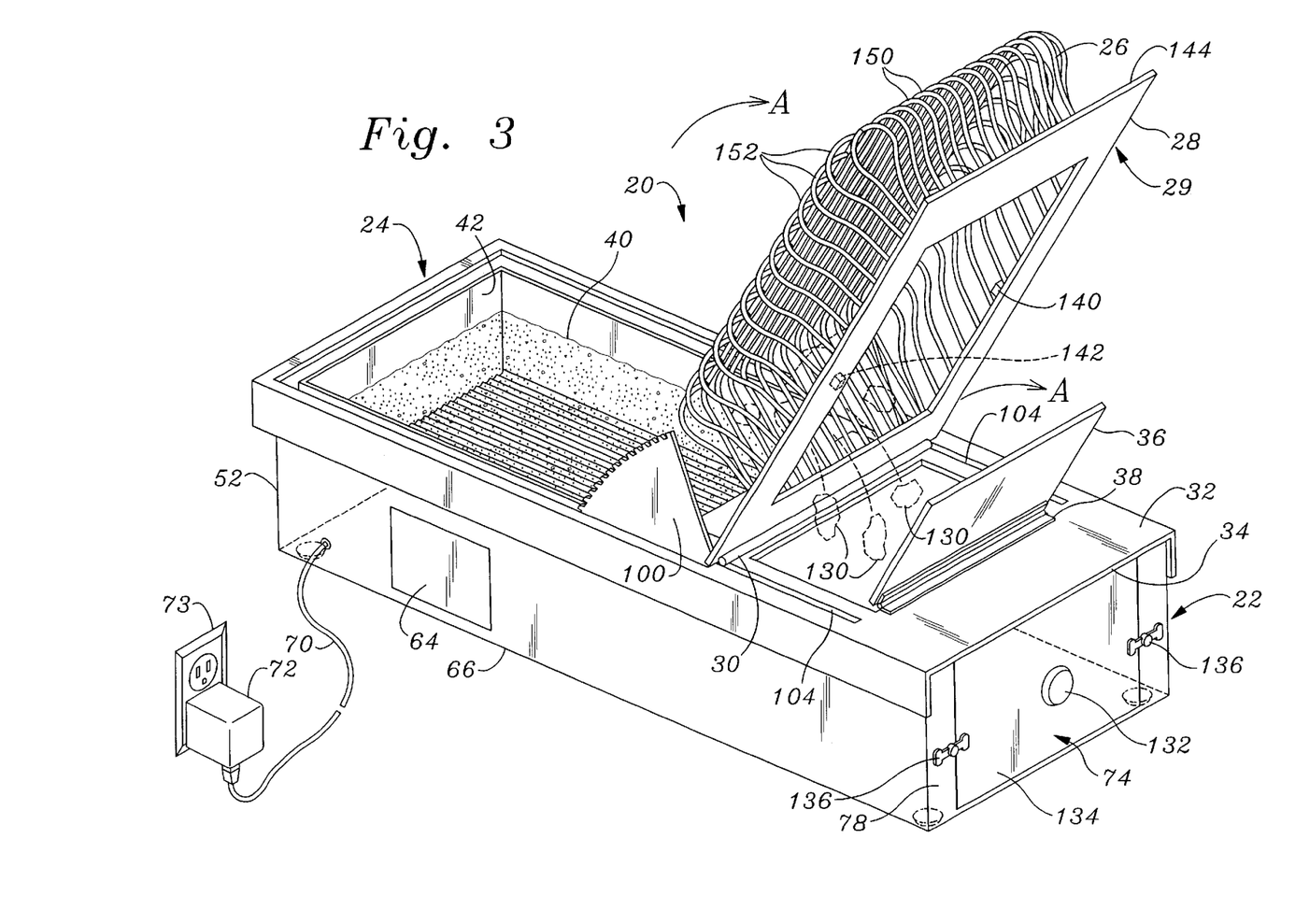
FIG. 3 is a perspective drawing of the self-cleaning cat litter box apparatus of FIG. 1, showing the waste collecting basket pivoted to its upright, waste discharging position and showing the door of the waste bin pivoted to its open position uncovering the waste bin for receiving clumped cat litter containing pet waste from the basket.

In FIG. 3, apparatus 20 is shown with basket assembly 29 pivoted upwardly in the direction of Arrow "A", to its elevated position such that cat litter clumps 130 (formed around cat urine and/or excrement) are dumped, by gravity, from basket 26 into waste bin 74 through door 36 that is also pivoted in the direction of Arrow "A" to its open position. One of arcuate rack gears 100 is shown in FIG. 3, the gear being attached to a corresponding one of basket frame extensions 102 (FIG. 1).

Also shown in FIG. 3 is a waste bin drawer pull or knob 132 fastened to an exposed waste bin end 134. Two pivoting latches 136 are mounted to base portion end 74 adjacent waste bin end 134 to releasably retain waste bin 74 in base portion 22.

Cat sensing photocell or infrared beam elements 140 and 142 are mounted in an opposing relationship to an under surface 144 of basket frame 28 in a location corresponding to about the longitudinal center of basket 26. As further shown in FIG. 3 (and as further described below), basket 26 is formed of a number of spaced apart longitudinal wires 150 and number of spaced apart, short transverse or side wires 152 that are connected to outboard ones of the longitudinal wires. As more particularly described below, basket longitudinal and side wires 150 and 152 are shaped to prevent litter clumping on the wires when lower regions of basket 26 are immersed in litter 40.

Figure 4:
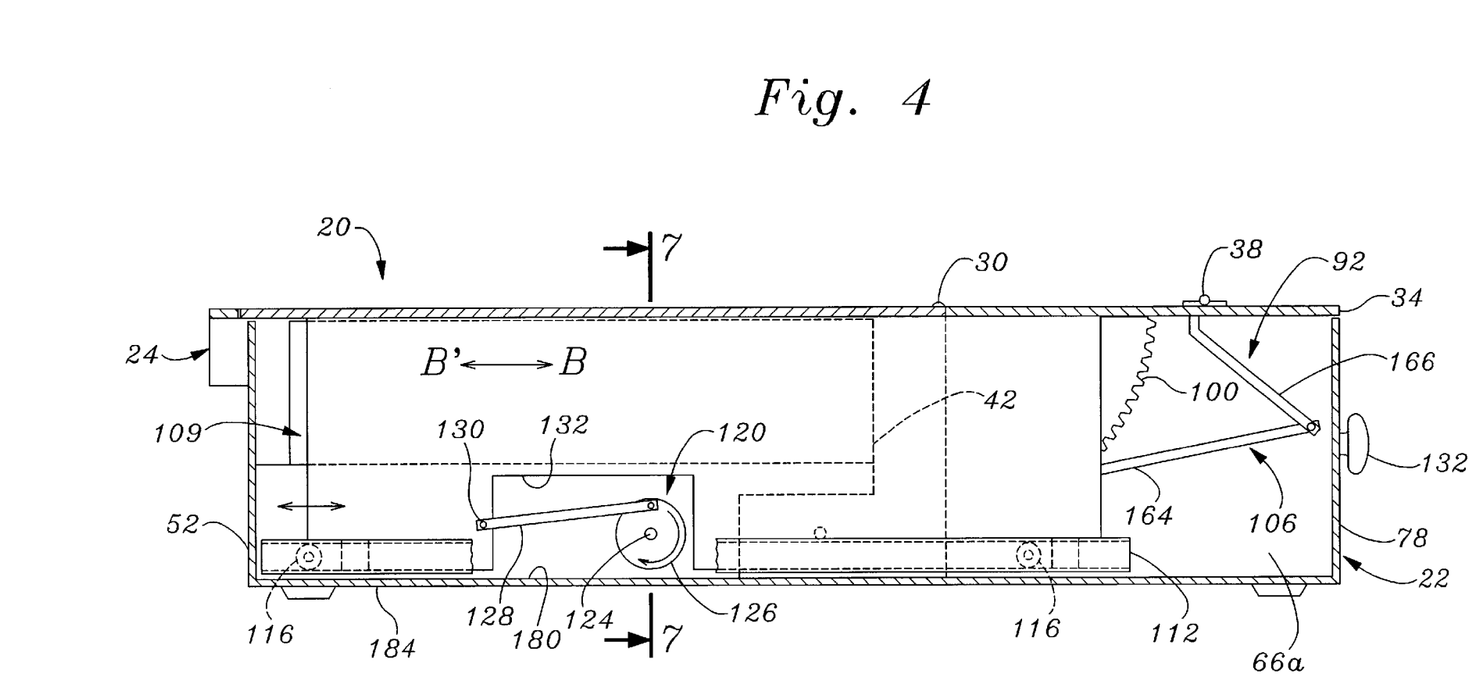
FIG. 4 is a longitudinal cross sectional view, looking along line 4—4 of FIG. 1, showing internal construction of the self-cleaning cat litter box apparatus of FIG. 1, particularly showing drive and linkages comprising the means for causing oscillating movement of the top portion relative to the base portion.

In the longitudinal cross section of FIG. 4, which is taken just inside of base portion outside wall 66, there is shown one half of means 120 for causing oscillating movement of top portion 24 (relative to base portion 22) in the direction of arrows "B" and "B'". The shown half of oscillating means 120 comprises link 128 that is pivotally attached at one end to motor-driven wheel 126 fixed on drive shaft 124, and at the other end to point 130 on top portion side 109. The other, opposing half of oscillating means 120 is similarly constructed.

Also shown in FIG. 4, by way of example, are portions of rail 112 into which wheels or rollers 116 at lower ends of top portion side 109 are received. Part of one half of basket assembly and bin door pivoting means 92 is also shown, including arcuate rack gear 100 and linkage 106 which comprises respective first and second links 164 and 166 that are pivotally connected together (more particularly described below).

Figure 5:
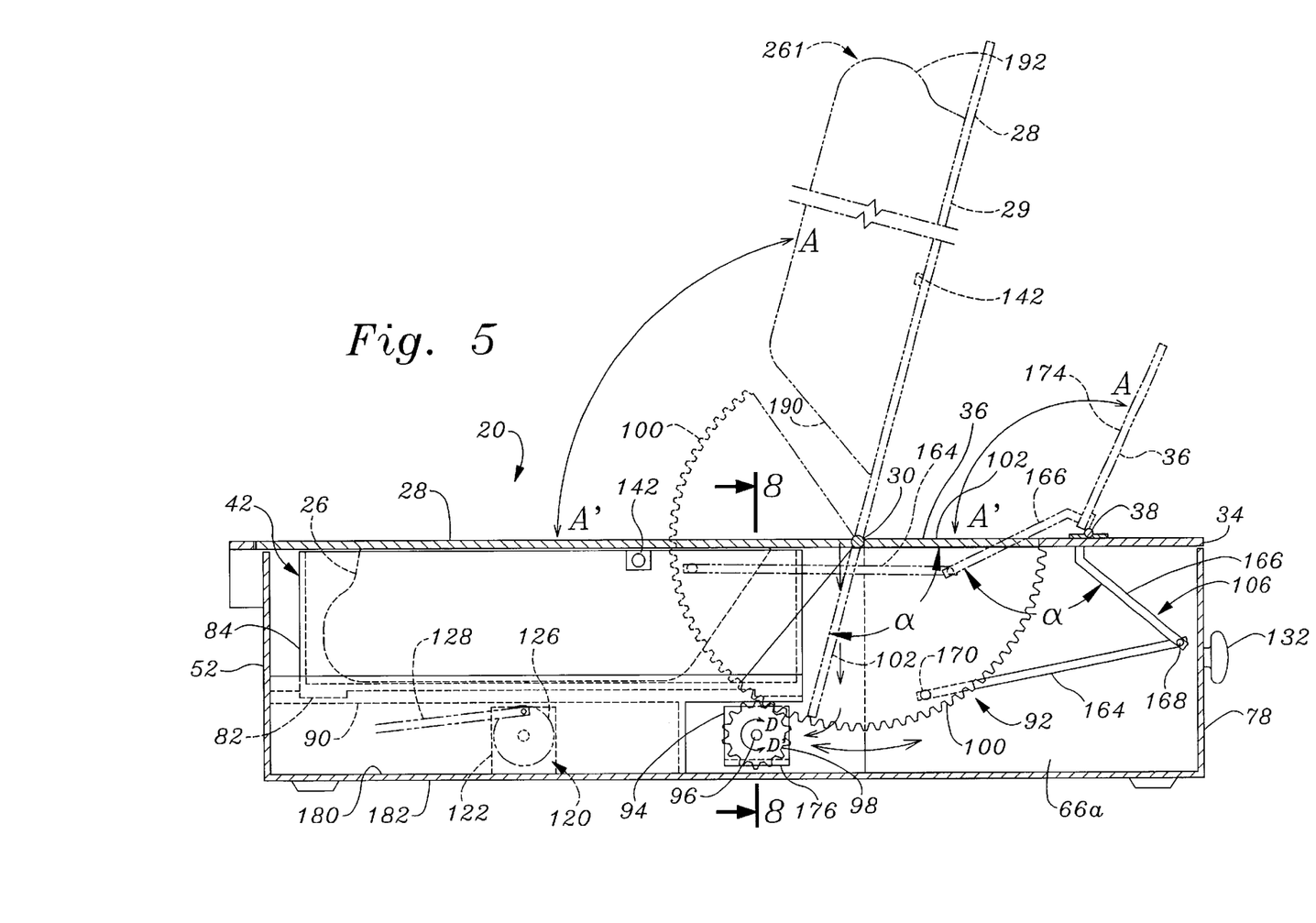
FIG. 5 is a longitudinal cross sectional view, looking along line 5—5 of FIG. 1, showing further internal construction features of the self-cleaning cat litter box apparatus of FIG. 1, showing the gearing and linkages comprising the means for causing pivotal movement of the basket and basket frame and the bin door, and showing in phantom lines the basket pivoted to its upright, clumped-litter discharging position and the bin door in its open position.

The longitudinal cross section of FIG. 5 is taken farther towards the longitudinal center of apparatus 20 than the cross section of FIG. 4 so as to show details of one half of basket frame and bin door drive means 92. Shown are links 154 and 166 that are pivotally connected together at a pin 168 to form linkage 106. Link 184 is pivotally connected to a back side of rack gear 100 by a pin 170. Link 166 is attached to an under surface 174 of bin door 36. Motor 94 is shown mounted on (attached to) a narrow transverse member 176 that is part of top portion 24.

As depicted, motor 94 and rack and pinion gears 100 and 98 are configured and operative for pivoting basket assembly 29 in the direction of Arrows A–A', through an angle, α, that is preferably at least about 90 degrees. Linkage 106 is configured and is connected between rack gear 100 and waste bin door 36 so that the door is pivoted open and closed in substantial unison with the pivoting of basket assembly 29 through angle, α.

As shown in FIG. 5 in phantom lines, oscillating means motor 122 is fixed to an upper surface 180 of base portion floor 182.

Figure 6:
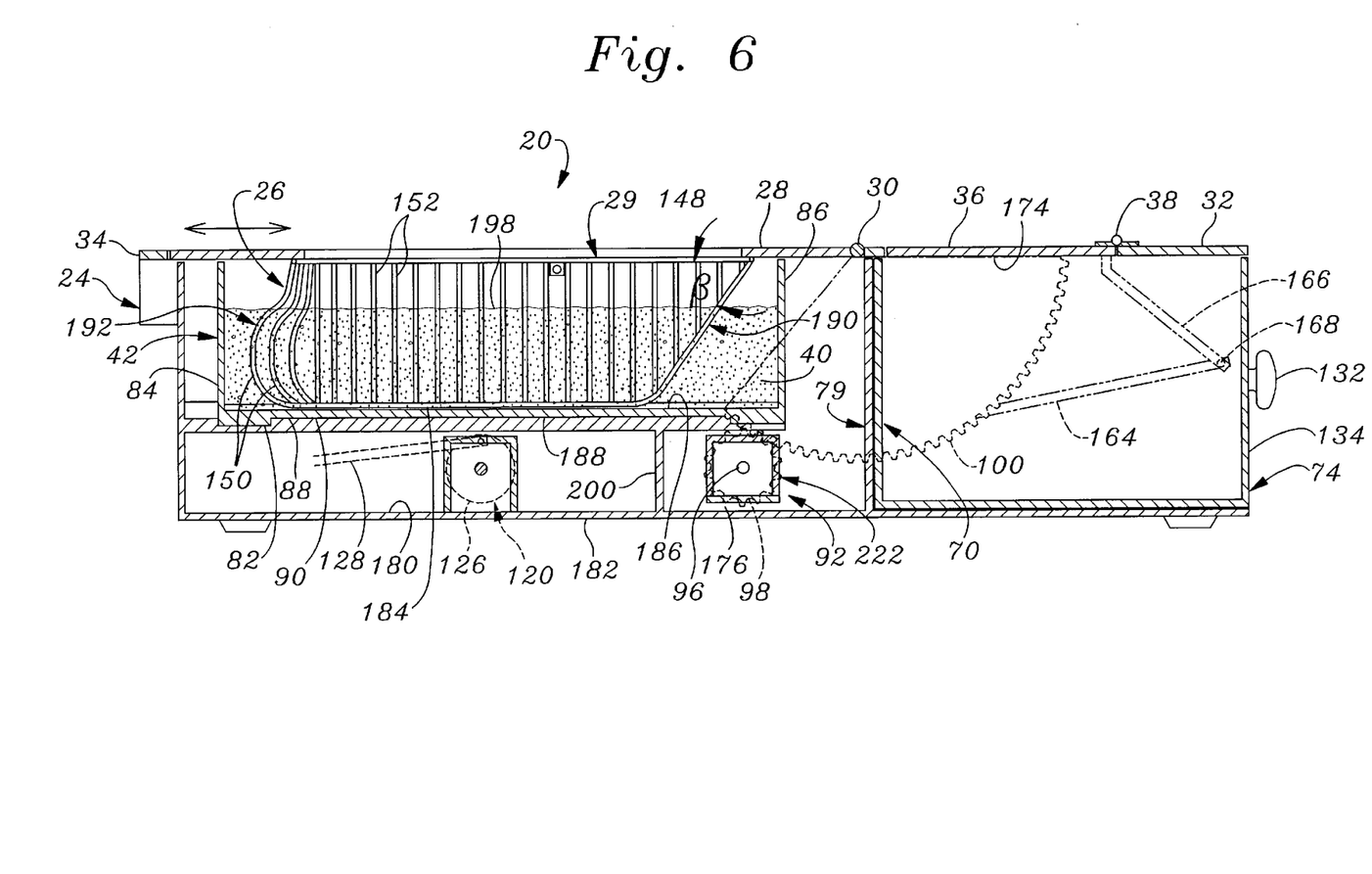
FIG. 6 is a longitudinal cross sectional view, looking along line 6—6 of FIG. 1, showing internal construction of the self-cleaning cat litter box apparatus of FIG. 1, particularly showing features of the waste collecting basket in its lowered position with major regions of the basket buried in cat litter disposed in the litter tray.

In FIG. 6, which is a longitudinal cross section taken along the longitudinal center of apparatus 20, basket 26 is shown in its lowered position with lower regions of the basket immersed in cat litter 40 contained in litter tray 42, 5., with a bottom 184 of basket 26 above-adjacent to an upper surface 186 of a litter tray bottom 188.

Also as shown, a first end 190 of basket 26 is angled toward a basket second end 192 so as to enable the dumping of cat waste-containing clumped litter from the basket when the basket is pivoted to the dumping position depicted in FIGS. 3 and 5. Basket longitudinal elements 150 at basket second end 192 are bowed outwardly, as depicted, by an amount sufficient to be free from cat waste-containing litter clumps formed at an exposed litter surface 198.

In FIG. 6, which is a longitudinal cross section taken at the transverse center of apparatus 20, basket 26 is shown in its lowered position with lower regions of the basket submerged in cat litter 40 contained in litter tray 42. In such lowered position of basket 26, a basket bottom 184 is at or very close to an upper surface 186 of a litter tray bottom 188.

A transverse tray vertical support web 200 is shown connected between tray support member 90 and base portion bottom wall 182.

Also as shown, a first end 190 of basket 26 is angled toward a basket second end 192 at an angle, β, that is preferably about 45 degrees. Such angling of basket first end 190 enables effective dumping of cat waste-containing litter clumps 130 from basket 26 when the basket is pivoted to the dumping position (FIG. 3, see also FIG. 5). Further, lower, litter-submerged regions of basket longitudinal elements 150 at basket second end 192 are shown bowed outwardly an amount sufficient to be free from accumulating cat waste-containing litter clumps (not shown) that form at an exposed litter surface 198.

FIG. 6 also shows, in broken (hidden) lines, a representative one of basket assembly pivoting rack and pinion gears, 100 and 98, respectively, as well as door operating link 166 and part of link 164 attached thereto. Also shown in broken lines is a representative one of basket assembly oscillating wheels 126 and attached link 128.

Figure 7:
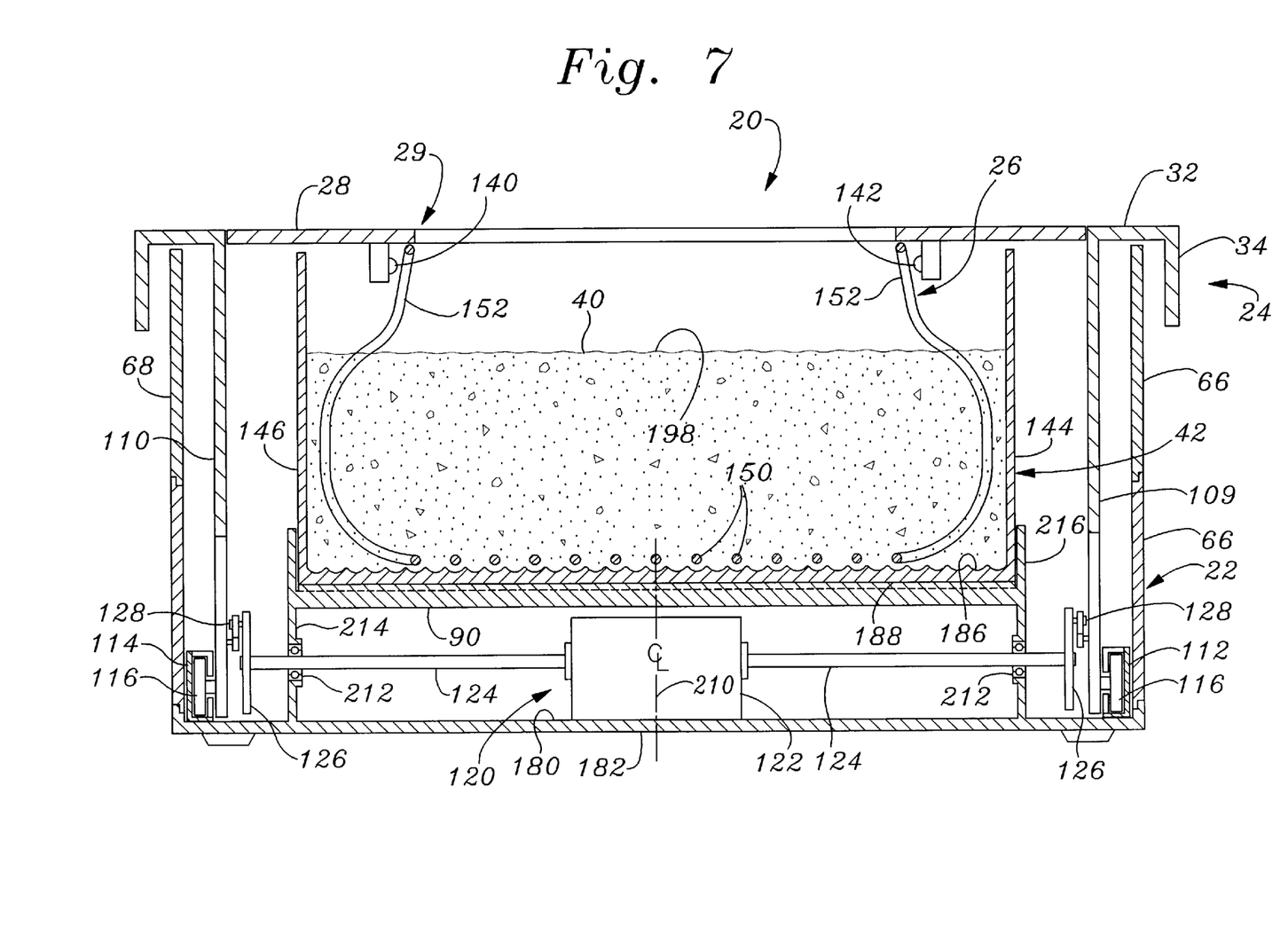
FIG. 7 is a transverse cross sectional view, looking along line 7—7 of FIG. 4, showing features of the means for causing oscillation movement of the top portion relative to the base portion and showing a bottom of the waste collecting basket at the bottom of the litter tray, and further showing the means for mounting the top portion to the base portion for permitting longitudinal oscillating movement of the top portion.

In the FIG. 7 transverse cross sectional view, oscillation motor 122 is shown mounted on base portion floor upper surface 180 at a transverse centerline of symmetry 210 of apparatus 20. Oscillation motor shaft 124 is shown passing through bearings 212 installed in opposing first and second short, vertical longitudinal litter tray support walls 214 and 216, respectively. Wheels 126 are shown fixed to ends of motor shaft 124. Rods 128 are shown attached between wheels 126 and top portion sides 109 and 110*m* which are mounted by rollers 116 in tracks 112 and 114.

As further shown in FIG. 7, lower regions of basket transverse members 152 that are submersed in cat litter 40 when basket is in its lowered position are shown bowed outwardly an amount sufficient to be free from accumulating cat waste-containing litter clumps (not shown) that form at exposed litter surface 198. Also upper surface 186 of litter tray bottom 188 is shown corrugated to match locations of basket longitudinal elements 150.

Figure 8:
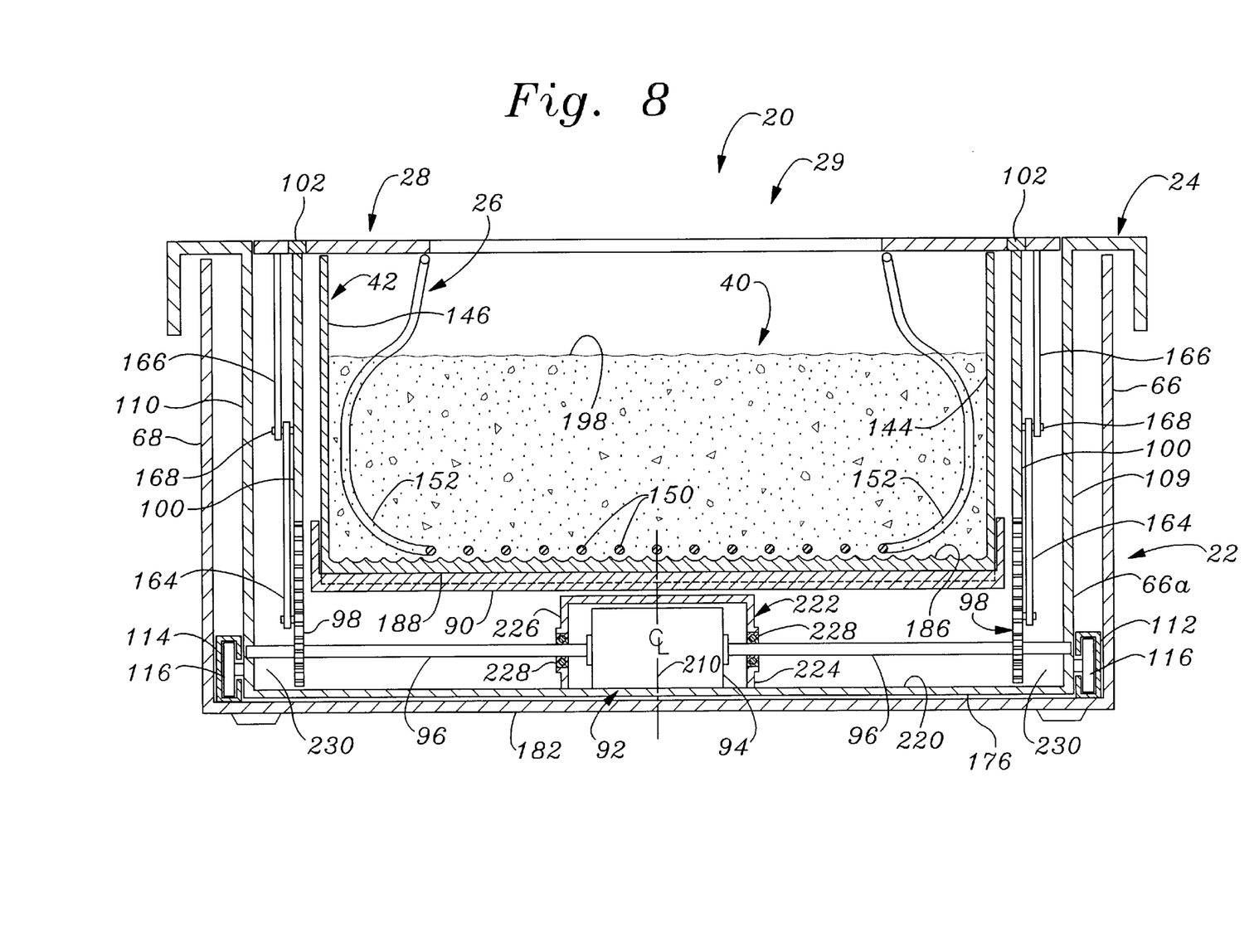
FIG. 8 is a transverse cross sectional view, looking along line 8—8 of FIG. 5, showing features of the means for causing pivoting of the waste-collecting basket and basket frame and the bin door.

FIG. 8 is a transverse cross section of apparatus 20 similar to FIG. 7 but taken further toward base portion end 134 to show aspects of basket frame pivoting means 92. Basket assembly and bin door pivoting motor 94 is shown fixed at centerline of transverse symmetry 210 to an upper surface 220 of transverse member 176 that extends transversely between top portion side walls 109 and 110 at their bottom ends. A motor box 222 has side walls 224 and 226 in which are installed bearings 228. Outboard ends of shaft 96 are received in recesses 230 formed in side walls 109 and 110. Pinion gears 98, which are fixed near the outboard ends of shaft 96, are shown in engagement with associated arcuate rack gears 100, upper regions of which are attached to basket frame extensions 102. Interconnected links 164 and 166 are shown connected between rack gears 100 and basket frame 28.

Figure 9:
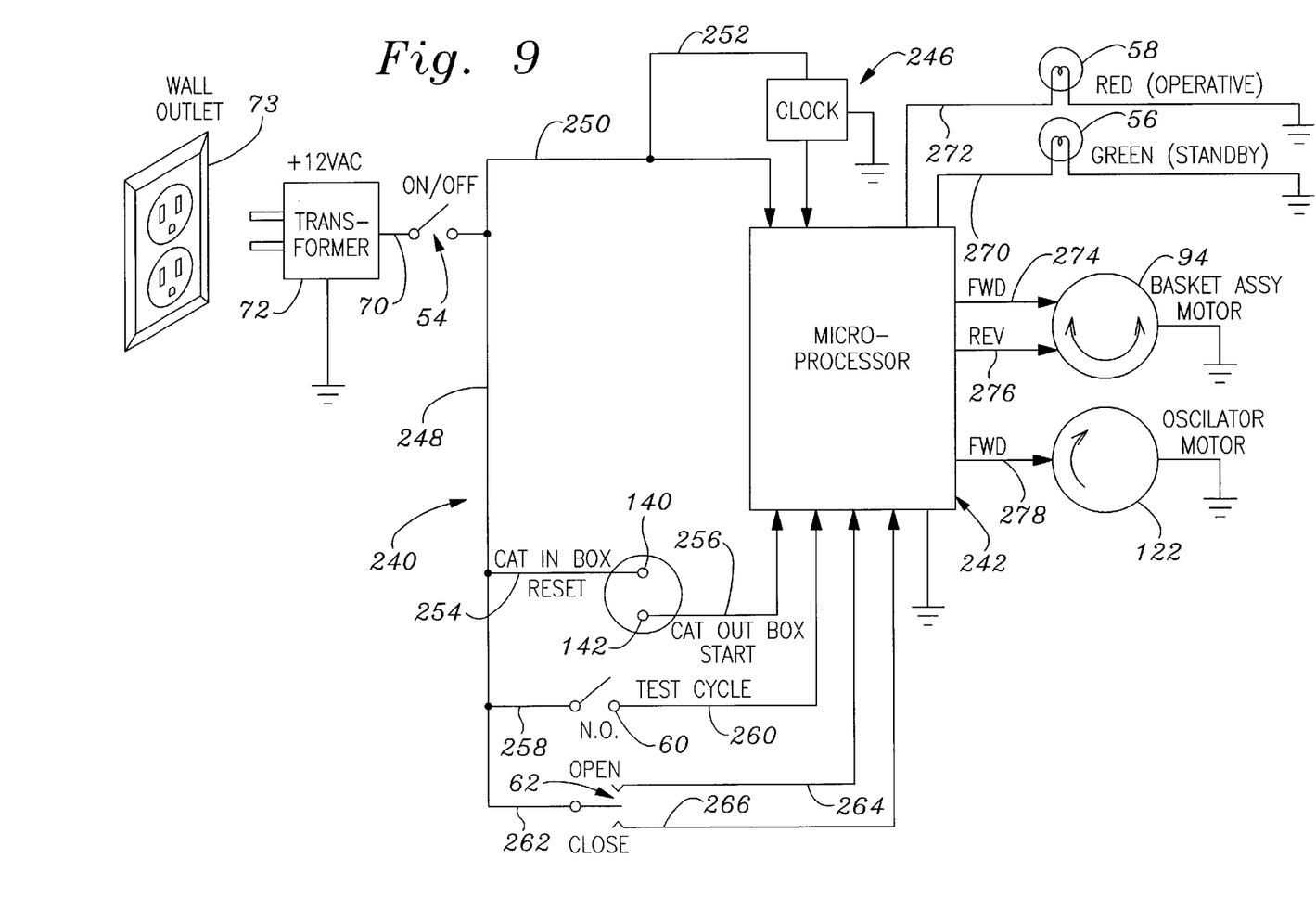
FIG. 9 is an electrical schematic drawing of the control portion of the self-cleaning cat litter box apparatus of FIG. 1, showing electrical features of the control portion.

FIG. 9 shows in diagrammatic form an operating and control system or means 240 which comprises a programmed microprocessor 242 to which is connected, over an electrical line 244 a clock 246. Transformer 72 that is plugged into wall outlet 73 provides +12 v power to microprocessor 242 and clock 246 through ON/OFF power switch 54 via electrical line 70, bus 248 and electrical lines 250 and 252. Infrared or optical switch element 140 is connected to bus 248 by an electrical line 254; switch element 142 being connected to microprocessor 242 by an electrical line 256. Normally open test switch 60 is connected to bus 248 by an electrical line 258 and to microprocessor 242 by an electrical line 260. Momentary OPEN/CLOSE switch 62 is connected to bus 248 by an electrical line 262 and by parallel electrical lines 264 and 266. Green STANDBY light 56 is connected to microprocessor 242 by an electrical line 270 and red OPERATING light 58 is connected to microprocessor 242 by an electrical line 272. Basket assembly and bin door pivoting motor 94 is connected to microprocessor 242 by a forward rotation electrical line 274 and a reverse rotation electrical line 276. Oscillation motor 122 is connected to microprocessor 242 by an electrical line 278.

The operation of apparatus 20 by operating and control means 240 is as follows:

1. Transformer 73 is plugged into wall outlet 73 and ON/OFF power switch 54 is turned "on" to thereby provide +12 V DC to bus 248, microprocessor 242 and clock 246.
2. When a cat enters litter tray 42, the circuit between switch elements 142 and 144 is interrupted, at which time microprocessor is triggered to energize green STANDBY light 56.
3. When the cat subsequently leaves litter tray 42, microprocessor 242 causes green STANDBY light 56 to start flashing and starts a one minute countdown delay period.

4. If a cat then enters litter tray 42 during the delay period, thereby re-interrupting switch elements 140 and 142, the countdown stops and green STANDBY light 56 stops flashing. (Step 3 is then repeated).

5. If no cat enters litter tray 42 during the delay period, at the end of the delay period, microprocessor 242 de-energizes green STANDBY light 56 and energizes red OPERATING light 58. Simultaneously, microprocessor 242 energizes basket assembly and bin door pivoting motor 94 to rotate in the direction causing basket assembly 29 to be elevated and waste bin door 30 to open. Microprocessor 242 also simultaneously energizes oscillation motor 122 to cause oscillation of top portion 24 relative to base portion 22.

6. When microprocessor 242 has energized basket assembly motor 94 a sufficient time for basket 26 to clear litter 40 in litter tray 42, the microprocessor de-energizes oscillation motor 122 to stop oscillation of top portion 24 relative to base portion 22.

7. When microprocessor 242 has energized basket assembly and bin door pivoting motor 94 a sufficient time for basket assembly 29 to be pivoted to its clumped litter dumping position, the microprocessor causes the motor to reverse operation and start returning the basket assembly to its lowered position.

8. When microprocessor 242 has energized basket assembly and bin door pivoting motor 94 a sufficient time for basket 26 to reach litter 40 in litter tray 42, the microprocessor energizes oscillation motor 122 to cause oscillation of top portion 24 relative to base portion 22.

9. When microprocessor 242 has energized basket assembly motor 94 a sufficient additional time for lower regions of basket 26 to completely immerse into litter 40 in litter tray 42, the microprocessor de-energizes both basket assembly and bin door pivoting motor 94 and oscillation motor 122. At the same time, microprocessor 242 de-energizes red OPERATING light 58 and energizes green STANDBY light 56, thereby signaling the end of the automatic cycling operation of apparatus 20.

10. By manual operation of test switch 60, microprocessor 242 causes a complete cycling of apparatus 20 as described above.

11. By manual operation of OPEN/CLOSE switch 62 to "open" microprocessor 242 is signaled to energize basket assembly and bin door pivoting motor 94 to pivot the basket assembly 29 to its clumped litter dumping position and then de-energize the motor to keep the basket assembly elevated so that, for example, litter tray 42 can be removed from base portion 22 for cleaning.

12. Subsequently when OPEN/CLOSE switch 62 is manually operated to "close", microprocessor 242 is signaled to energize basket assembly and bin door pivoting motor 94 to pivot basket assembly 29 back down to its fully lowered position and then de-energize the motor. As above described, microprocessor 242 also energizes oscillation motor 122 while basket 26 is being lifted from litter 40 in litter tray 42 and is subsequently being immersed in litter in the litter tray.

Thus, there has been described above an automated, self-cleaning cat litter box apparatus for purposes of illustrating the manner in which the present invention may be used to advantage. It will, however, be appreciated that the invention is not limited thereto but includes any and all variations and modifications which may occur to those skilled in the art without violating the scope and spirit of the claims as appended hereto.

What is claimed is:

1. A self-cleaning cat litter box apparatus, said apparatus comprising:
    a. a litter tray for containing a quantity of cat litter;
    b. a waste bin;
    c. a mesh basket sized for having a lower basket regions received into said litter tray, said basket being pivotally mounted relative to said litter tray for pivotal movement between a lowered position in which a lower region of the basket is immersed in cat litter contained in said litter tray and a raised, tilted position in which cat waste-containing clumped litter picked up in the basket from the litter in the litter tray is gravity dumped into said waste bin;
    d. a reversing electric basket pivoting motor connected for causing the pivoting of said basket between said lowered position and said raised, tilted position;
    e. control means configured for causing said electric basket pivoting motor to rotate in one direction to pivot the basket from the lowered position to the raised, tilted position and for then causing said electric basket pivoting motor to rotate in an opposite direction to pivot the basket from the raised, tilted position back to the lowered position; and
    f. an electric basket oscillating motor connected for causing the basket to oscillate back and forth relative to said litter tray.

2. The self-cleaning cat litter box apparatus as claimed in claim 1, wherein said control means are configured for causing said basket oscillating motor to oscillate the basket back and forth relative to the litter tray when the electric basket pivoting motor starts pivoting the basket from the lowered position toward the raised, tilted position and when the electric basket pivoting motor subsequently pivots the basket back to engagement with the litter contained in the litter tray so as to facilitating both the raising the lower regions of the basket through litter contained in the litter tray and the subsequent immersion of the lower regions of the basket into litter contained in the litter tray.

3. A self-cleaning cat litter box apparatus, said apparatus comprising:
    a. a litter tray for containing a quantity of cat litter;
    b. a waste bin;
    c. a waste bin door hinged for pivotal movement between a closed position covering the waste bin and an open position uncovering the waste bin; and
    d. a mesh basket sized for having a lower basket regions received into said litter tray, said basket being pivotally mounted relative to said litter tray for pivotal movement between a lowered position in which a lower region of the basket is immersed in cat litter contained in said litter tray and a raised, tilted position in which cat waste-containing clumped litter picked up in the basket from the litter in the litter tray is gravity dumped into said waste bin.

4. The self-cleaning cat litter box apparatus as claimed in claim 3, wherein said waste bin door is connected for pivoting from the closed position to the open position as the basket is pivoted from the lowered position to the raised, tilted position and for pivoting of the door from the open to the closed position as the basket is pivoted from the raised, tilted position back to the lowered position.

5. A self-cleaning cat litter box apparatus, said apparatus comprising:
    a. a litter tray for containing a quantity of cat litter;
    b. a waste bin;
    c. a rigid basket frame;

d. a mesh basket having a lower region sized for being received into said litter tray; said basket being attached to said basket frame to form a basket assembly, said basket assembly being hinged relative to said litter tray for pivotal movement between a lowered position in which said lower region of the basket is immersed in cat litter contained in said litter tray and a raised, tilted position in which cat waste-containing clumped litter picked up by said basket from the litter in the litter tray is gravity dumped from the basket into said waste bin;

e. a reversing electric basket assembly pivoting motor connected for causing the pivoting of said basket assembly between said lowered position and said raised, tilted position; and f. an electric basket oscillating motor connected for causing the basket assembly to oscillate back and forth relative to said litter tray.

6. The self-cleaning cat litter box apparatus as claimed in claim 5, including control means configured for causing said electric basket assembly pivoting motor to rotate in one direction to pivot the basket assembly from the lowered position to the raised, tilted position and for then causing said electric basket assembly pivoting motor to rotate in an opposite direction to pivot the basket assembly from the raised, tilted position back to the lowered position, a starting of said control means being responsive to a cat entering and subsequently leaving the litter tray.

7. The self-cleaning cat litter box apparatus as claimed in claim 6, wherein the starting of said control means is delayed for a period of at least about one minute after a cat enters and subsequently leaves the litter tray, and wherein the starting of said control means is cancelled in response to a cat entering the litter tray within said delay period.

8. The self-cleaning cat litter box apparatus as claimed in claim 6, wherein said control means are configured for causing said basket oscillating motor to oscillate the basket back and forth relative to the litter tray when the electric basket pivoting motor starts pivoting the basket from the lowered position toward the raised, tilted position and when the electric basket pivoting motor subsequently pivots the basket back close to the lowered position, thereby facilitating both the lifting of the basket lower regions up through the litter contained in the litter tray and the subsequent immersion of the basket lower regions into the litter contained in the litter tray.

9. The self-cleaning cat litter box apparatus as claimed in claim 5, including a waste bin door hinged for pivotal movement between a closed position covering the waste pin and an open position uncovering the waste bin, said door being connected for pivoting from the closed position to the open position as the basket assembly is pivoted from the lowered position to the raised, tilted position and for pivoting of the door from the open to the closed position as the basket assembly is pivoted from the raised, tilted position to the lowered position.

10. A self-cleaning cat litter box apparatus comprising:
a. a base portion;
b. a litter tray configured for containing a quantity of cat litter, said tray having a bottom and being removably installed in said base portion;
c. a litter waste collecting and disposing portion having a top and sides;
d. a basket assembly including a basket frame and a wire mesh basket attached to said basket frame, said basket having a top, a bottom, sides and first and second ends, said basket frame being hinged, along a basket frame hinge line, adjacent said basket first end to the top of said litter waste collecting and disposing portion;
e. a waste bin removably received in said base portion, said waste bin having an open top and including a waste bin door hinged along a waste bin cover hinge line to the top of said litter waste collecting and disposing portion, the waste bin door hinge line being parallel to the basket frame hinge line and being located so said door is close to said basket first end;
f. a basket assembly pivoting motor connected for pivoting said basket assembly through a basket assembly pivoting angle between a first, litter engaging position and a second, elevated, cat waste-containing clumped litter dumping position, and connected for causing at least substantially simultaneous pivoting of said waste bin door through a door pivoting angle between a first, closed position covering the waste bin open top and a second, open position uncovering the waste bin open top thereby enabling waste dumping access to the waste bin;
g. means mounting the litter waste collecting and disposing portion onto said base portion so that when said basket assembly is in said first, litter engaging position, the bottom of the basket is adjacent the bottom of said litter tray and is beneath cat litter contained in said tray; and
h. control means responsive to a cat entering and subsequently exiting said litter tray for enabling said basket assembly pivoting motor to pivot the basket assembly from said first, litter engaging position to said second, cat waste-containing clumped litter dumping position and to pivot said waste bin door from said first, closed position to said second, open position, thereby causing cat waste-containing clumped litter picked up by the basket from the litter contained in the litter tray to be gravity dumped from the basket into the open waste bin, and thereafter for causing the basket assembly pivoting motor to pivot the basket assembly back to its first, litter tray engaging position and to pivot the waste bin door back to its first, closed position.

11. The automated, self-collecting cat litter box apparatus as claimed in claim 10, including a oscillation-causing electric motor connected for causing oscillatory movement between the litter waste collecting and disposing portion and said base portion in a longitudinal direction that is orthogonal to the basket frame hinge line as the basket assembly is being pivoted from its first litter engaging position and as the basket assembly is subsequently being pivoted back to its first litter engaging position, thereby assisting lifting of the basket through cat litter contained in the litter tray and thereby subsequently assisting the bottom of the basket to immerse into cat litter contained in the litter tray.

12. The automated, self-collecting cat litter box apparatus as claimed in claim 11, wherein said second motor causes oscillatory motion of the litter waste collecting and disposing portion through a distance of at least about one inch while the base portion remains stationary.

13. The self-cleaning cat litter box apparatus as claimed in claim 10, wherein the starting of said control means is delayed for a period of at least about one minute after a cat enters and subsequently leaves the litter tray to provide for litter clumping, and wherein the starting of said control means is cancelled in response to a cat entering the litter tray during said delay period.

14. The self cleaning cat litter box apparatus as claimed in claim 10, wherein lower regions of said basket sides and second end are bowed outwardly and said basket first end is angled toward said basket second end.

\* \* \* \* \*